(12) United States Patent
Yamato et al.

(10) Patent No.: US 9,110,812 B2
(45) Date of Patent: Aug. 18, 2015

(54) VIRTUAL TAPE DEVICE AND CONTROL METHOD OF VIRTUAL TAPE DEVICE

(71) Applicant: FUJITSU LIMITED, Kawasaki-shi, Kanagawa (JP)

(72) Inventors: Takaaki Yamato, Nagano (JP); Fumio Matsuo, Nagano (JP); Katsuo Enohara, Kawaguchi (JP); Nobuyuki Hirashima, Nagano (JP); Takashi Murayama, Nagano (JP); Tetsuya Kinoshita, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 13/748,908

(22) Filed: Jan. 24, 2013

(65) Prior Publication Data

US 2013/0205083 A1    Aug. 8, 2013

(30) Foreign Application Priority Data

Feb. 3, 2012    (JP) .................................. 2012-022326

(51) Int. Cl.
*G06F 3/00*  (2006.01)
*G06F 12/08*  (2006.01)
*G06F 3/06*  (2006.01)

(52) U.S. Cl.
CPC ............ *G06F 12/0866* (2013.01); *G06F 3/065* (2013.01); *G06F 3/0611* (2013.01); *G06F 3/0686* (2013.01); *G06F 2212/213* (2013.01); *G06F 2212/224* (2013.01)

(58) Field of Classification Search
None
See application file for complete search history.

(56) References Cited

U.S. PATENT DOCUMENTS

| 5,327,535 A | 7/1994 | Ogata et al. |
| 2003/0005223 A1 * | 1/2003 | Coulson et al. .............. 711/118 |
| 2007/0088929 A1 * | 4/2007 | Hanai et al. .................. 711/165 |
| 2008/0005465 A1 * | 1/2008 | Matthews ...................... 711/113 |
| 2011/0145494 A1 * | 6/2011 | Mitsuma et al. .............. 711/111 |

FOREIGN PATENT DOCUMENTS

| JP | 5-73221 | 3/1993 |
| JP | 2011-123834 | 6/2011 |

* cited by examiner

*Primary Examiner* — Cheng-Yuan Tseng
*Assistant Examiner* — Craig Goldschmidt
(74) *Attorney, Agent, or Firm* — Staas & Halsey LLP

(57) ABSTRACT

A virtual tape device includes a memory to record logical volume information that includes an identifier of a logical volume, an identifier of a physical volume that stores data of the logical volume, and information that indicates whether the data of the logical volume is cached in a cache unit, in association with each other. A determining unit that, when a copy command to copy data of the logical volume stored in a first physical volume to a second physical volume is received, determines whether a logical volume cached in the cache unit exists among the logical volumes, and a storage control unit that, when it is determined that the logical volume cached in the cache unit exists among the logical volumes, stores the data of the logical volume cached in the cache unit to the second physical volume without reference to an order indicated in the copy command.

4 Claims, 9 Drawing Sheets

| LV | PV | TVC | DATA SIZE | LAST UPDATE TIME |
|---|---|---|---|---|
| LV0001 | PV0001 | UNCACHED | 64 MB | 2011/07/22 18:38:19 |
| LV0002 | PV0001 | UNCACHED | 128 MB | 2011/07/22 20:42:54 |
| LV0003 | PV0002 | UNCACHED | 64 MB | 2011/07/22 23:11:40 |

| SPECIFIED ORDER | LV | PROCESSING COMPLETION |
|---|---|---|
| 1 | LV0001 | 0 |
| 2 | LV0002 | 0 |
| 3 | LV0003 | 1 |

# VIRTUAL TAPE DEVICE AND CONTROL METHOD OF VIRTUAL TAPE DEVICE

CROSS-REFERENCE TO RELATED APPLICATION

This application is based upon and claims the benefit of priority of the prior Japanese Patent Application No. 2012-022326, filed on Feb. 3, 2012, the entire contents of which are incorporated herein by reference.

FIELD

The embodiments discussed herein are related to a virtual tape device and a control method of a virtual tape device.

BACKGROUND

A virtual tape system has a tape library and a virtual tape device. The tape library has a physical volume (referred to herein-below as "PV") such as an electromagnetic tape for storing data. The virtual tape device has a tape volume cache (TVC) and is provided between a host and the tape library. The TVC may be realized by redundant arrays of inexpensive disks (RAID).

The virtual tape device caches data read from the tape library PV in the TVC as a logical volume (referred to herein-below as "LV"). In this way, the virtual tape system caches data in the TVC and allows the host to access the data faster by reducing operations of mount processing or un-mount processing of the PV in the tape library.

Data stored in the PV in the virtual tape system may be desirably saved outside of the tape library and used by another virtual tape device. Consequently, after the LV data stored in the PV by the virtual tape device is stored in the new PV in the virtual tape system, an export operation to carry the PV outside of the tape library is performed.

In the prior art, the virtual tape device stores a plurality of specified LVs in a PV for export in a specified order when performing the export process. Specifically, the virtual tape device writes cached LVs directly into the export PV from the TVC. The virtual tape device first reads un-cached LVs into the TVC from the PV in which the LVs are stored, and then writes the un-cached LVs to the export PV. An example of an export process on un-cached LVs will be explained with reference to FIG. 8.

FIG. 8 illustrates an example of an export process for un-cached LVs. It is assumed in this example that the specified order of the LVs to be exported is LV 901, LV 902, and LV 903. LV 901 and LV 902 are stored in PV 911, and LV 903 is stored in PV 912.

As illustrated in FIG. 8, the virtual tape device mounts the PV 911, reads the LV 901 and the LV 902 into the TVC 930 (steps S901 and S902 respectively), and writes the LV 901 and the LV 902 into an export PV 920 (steps S903 and S904 respectively). Then, the virtual tape device un-mounts the PV 911 and mounts the PV 912. The virtual tape device then reads the LV 903 from the PV 912 to the TVC 903 (step S905), and writes the LV 903 into the export PV 920 (step S906). Then, the virtual tape device un-mounts the PV 912 and the export process is finished. In this way, the virtual tape device writes the LVs to be exported into the export PV in the specified order.

However, there is a problem in the prior art in that the export process takes a long time to perform. Specifically, the virtual tape device may perform excessive mounting and un-mounting of the PVs that stores the LVs to be exported when writing the LVs to be exported to the export PV.

An export process in which excessive mounting and un-mounting is performed will be described with reference to FIGS. 9 and 10. FIG. 9 illustrates an example of performing excessive PV mounting and un-mounting in an export process, and FIG. 10 illustrates another example of performing excessive PV mounting and un-mounting in an export process.

It is assumed in the example in FIG. 9 that the specified order of the LVs to be exported is the LV 901, the LV 902, and the LV 903, and the LV 901 and the LV 902 are stored in the PV 911, and the LV 903 is stored in the PV 912 in the same way as FIG. 8. Moreover, it is assumed that the LV 903 is already cached in the TVC 930 and the TVC 930 is full.

As illustrated in FIG. 9, the virtual tape device loads the PV 911, but the LV 903 is removed from the TVC 930 (step S910) before reading the LV 901 and the LV 902 into the TVC 930 (steps S911 and S912 respectively). The virtual tape device then writes the LV 901 and the LV 902 into the export PV 920 (step S913 and S914 respectively).

Next, the virtual tape device un-mounts the PV 911 and mounts the PV 912. The virtual tape device then reads the LV 903 from the PV 912 to the TVC 930 (step S915), and writes the LV 903 into the export PV 920 (step S916). Then, the virtual tape device unloads the PV 912 and the export process is finished.

In this way, the virtual tape device executes excessive mounting and un-mounting of the PV 912 since the LV 903 to be exported and that is already cached is removed from the TVC 930 when reading the LV 901 and the LV 902.

It is assumed in the example in FIG. 10 that the specified order of the LVs to be exported is the LV 901, the LV 903, and the LV 902, and the LV 901 and the LV 902 are stored in the PV 911, and the LV 903 is stored in the PV 912. Moreover, the LV 901, the LV 903, and the LV 902 are all un-cached.

As illustrated in FIG. 10, the virtual tape device mounts the PV 911, reads the LV 901 into the TVC 930 (step S920), and writes the LV 901 into the export PV 920 (step S921). Then, the virtual tape device un-mounts the PV 911 and mounts the PV 912. The virtual tape device then reads the LV 903 from the PV 912 to the TVC 930 (step S922), and writes the LV 903 into the export PV 920 (step S923).

Then, the virtual tape device un-mounts the PV 912 and mounts the PV 911. The virtual tape device then reads the LV 902 from the PV 911 to the TVC 930 (step S924), and writes the LV 902 into the export PV 920 (step S925). In this way, the virtual tape device mounts and un-mounts the PV 911 twice.

Japanese Laid-open Patent Publication Nos. 5-73221 and 2011-123834 are examples of related art.

SUMMARY

According to an aspect of the embodiments, a virtual tape device includes a memory to record logical volume information that includes an identifier of a logical volume, an identifier of a physical volume that stores data of the logical volume, and information that indicates whether the data of the logical volume is cached in a cache unit, in association with each other. A determining unit that, when a copy command to copy data of the logical volume stored in a first physical volume to a second physical volume is received, determines whether a logical volume cached in the cache unit exists among the logical volumes indicated in the copy command based on the logical volume information. And a storage control unit that, when the determining unit determines that the logical volume cached in the cache unit exists among the logical volumes at receiving the copy command, stores the data of the logical volume cached in the cache unit among the logical volumes at receiving the copy command to the second physical volume, without reference to an order indicated in the copy command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an example of information stored in a logical volume information table according to the first embodiment;

FIG. 4 is an example of information stored in a specified order management table according to the first embodiment;

DESCRIPTION OF EMBODIMENTS

Embodiments of a virtual tape device and a control method for a virtual tape device as discussed herein will described with reference to the drawings. The present disclosure is not limited to the embodiments disclosed herein. The embodiments may be combined within the limitations of consistency of the contents of the processing.

Embodiment 1

The first embodiment discusses an example of an information processing system that includes a virtual tape device. A configuration of the information processing system, procedural operations of the virtual tape device, and operating procedures performed by the virtual tape device will be described below with reference to FIGS. 1 to 7.

(Configuration of Information Processing System According to First Embodiment)

Figure 1:
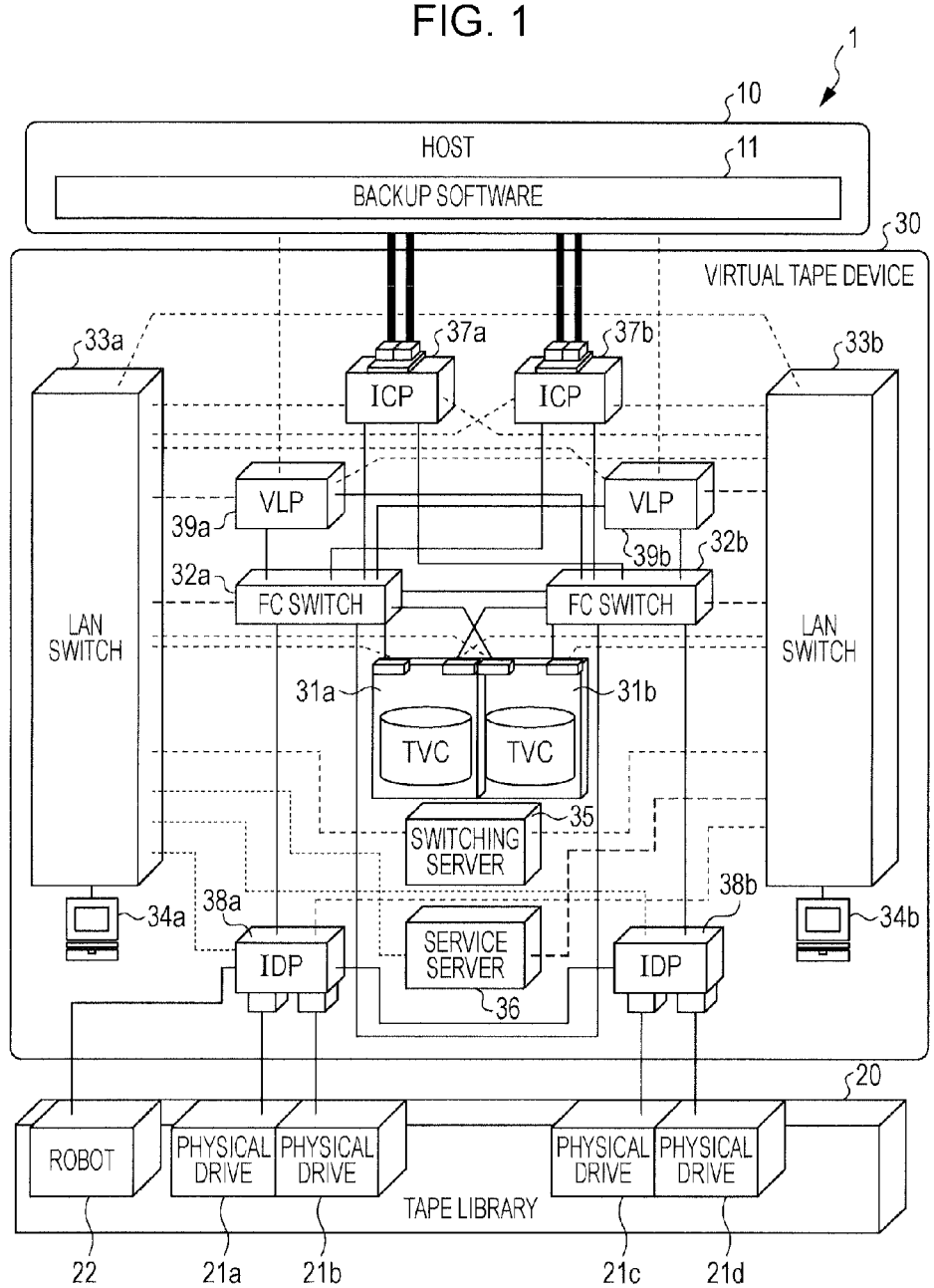
FIG. 1 illustrates an example of a configuration of an information processing system according to a first embodiment.

The configuration of the information processing system according to the first embodiment will be described with reference to FIG. 1. FIG. 1 illustrates an example of a configuration of an information processing system according to the first embodiment. As illustrated in FIG. 1, an information processing system 1 includes a host 10, a tape library 20, and a virtual tape device 30. The number of hosts is not limited to the description and may be changed. As illustrated in FIG. 1, the virtual tape device 30 in the information processing system 1 is connected to the host 10 and the tape library 20.

The host 10 is, for example, a mainframe having backup software 11. The host 10 sends commands to the virtual tape device 30 to read data from the tape library 20 and to write data to the tape library 20.

The host 10 sends a command to the virtual tape device 30 to perform export processing of data stored in physical volumes (referred to below as "PV") in the tape library 20 as described below. Export processing herein refers to processing for copying data stored as a logical volume (referred to below as "LV") in one PV to another PV. In the following descriptions, an LV indicated in a command for export processing will be described as an "LV to be exported." Moreover, the PV that stores the LV to be exported will be referred to as a "first physical volume," and the PV for export to which the LV to be exported is copied will be referred to as a "second physical volume."

The host 10 specifies an order to the plurality of LVs to be exported in the command for the export processing. However this order does not specify the order of storing the LVs to be exported.

The tape library 20 includes physical drives 21a, 21b, 21c, and 21d, and a robot 22. The numbers of the physical drives and the robots in the tape library 20 are not limited to those described in FIG. 1 and may be changed. The tape library 20 also includes a PV that is not illustrated. For example, the PV may be an electromagnetic tape such as a linear tape open (LTO) cartridge for storing LV data.

The physical drives 21a, 21b, 21c, and 21d write data to the PVs set therein, and run the PVs set therein to read the stored data. The robot 22 extracts PVs kept in cells (not illustrated) and sets the PVs in any of the physical drives 21a to 21d.

The virtual tape device 30 includes tape volume caches (TVC) 31a and 31b, fiber channel (FC) switches 32a and 32b, and local area network (LAN) switches 33a and 33b. The virtual tape device 30 further includes consoles 34a and 34b, a switching server 35, and a service server 36. The virtual tape device 30 further includes integrated channel processors (ICP) 37a and 37b, integrated device processors (IDP) 38a and 38b, and virtual library processors (VLP) 39a and 39b.

The FC switch 32a is connected via fiber channels to the TVCs 31a and 31b, the ICPs 37a and 37b, the IDPs 38a and 38b, and the VLPs 39a and 39b. The FC switch 32b is connected via fiber channels to the TVCs 31a and 31b, the ICPs 37a and 37b, the IDPs 38a and 38b, and the VLPs 39a and 39b. The FC switch 32a and the FC switch 32b are connected to each other by a fiber channel. The ICP 37a and the ICP 37b are connected to each other by a fiber channel. The IDP 38a and the IDP 38b are connected to each other by a fiber channel. The VLP 39a and the VLP 39b are connected to each other by a fiber channel.

The TVC 31a, the FC switch 32a, the LAN switch 33a, the console 34a, the ICP 37a, the IDP 38a, and the VLP 39a of the virtual tape device 30 function as a 0-series virtual tape device. The TVC 31b, the FC switch 32b, the LAN switch 33b, the console 34b, the ICP 37b, the IDP 38b, and the VLP 39b of the virtual tape device 30 function as a 1-series virtual tape device.

The 0-series virtual tape device and the 1-series virtual tape device represent a standby system and an operational system relationship, and the following description will consider the 0-series virtual tape device as the operational system, and the 1-series virtual tape device as the standby system.

The various units provided in the 0-series virtual tape device and the 1-series virtual tape device are functionally similar and the following description does not differentiate between the 0-series virtual tape device and the 1-series virtual tape device. For example, the TVC 31a and the TVC 31b are functionally similar and will be referred to as a TVC 31. The FC switch 32a and the FC switch 32b are functionally similar and will be referred to as an FC switch 32. The LAN switch 33a and the LAN switch 33b are functionally similar and will be referred to as a LAN switch 33. The console 34a and the console 34b are functionally similar and will be referred to as a console 34. The ICP 37a and the ICP 37b are functionally similar and will be referred to as an ICP 34. The IDP 38a and the IDP 38b are functionally similar and will be referred to as an IDP 38. The VLP 39a and the VLP 39b are functionally similar and will be referred to as a VLP 39.

The TVC 31 includes a file system and redundant arrays of inexpensive disks (RAID) storage, and stores a plurality of LVs. The FC switch 32 is a switch for mutually connecting the fiber channel interfaces of various devices. The TVC 31, the ICP 37, the IDP 38 and the VLP 39 are interconnected with fiber channels.

The LAN switch 33, the TVC 31, the FC switch 32, the console 34, the switching server 35, the service server 36, the ICP 37, the IDP 38, and the VLP 39 are all connected to each other through a LAN to allow for communication.

The console 34 includes a CPU and a main storage device, and provides a user interface for the ICP 37, the IDP 38, and the VLP 39 to be operated.

The switching server 35 includes a CPU and a main storage device. The switching server 35 checks the operations of the 0-series virtual tape device and the 1-series virtual tape device, and controls switching between the operational system and the standby system. Accordingly, the switching server 35 inhibits the occurrence of a so-called split brain between the 0-series virtual tape device and the 1-series virtual tape device.

The service server 36 includes a CPU and a main storage device, and performs maintenance on the ICP 37, the IDP 38, and the VLP 39.

The ICP 37 includes a CPU and a main storage device. The ICP 37 is provided with a channel interface card and is connected to the host 10 using a storage connection interface such as FCLINK (trademark) or OCLINK (trademark) and the like.

The ICP 37 receives commands from the host 10 to read LV data from the tape library 20 and to write LV data to the tape library 20. The ICP 37 sends requests to the below-mentioned VLP 39 to read LV data from the tape library 20 and write LV data to the tape library 20.

The IDP 38 includes a CPU and a main storage device. The IDP 38 includes data paths to the physical drives of the tape library 20. The IDP 38 controls a robot to perform loading and unloading of PVs when requests to load and unload PVs are received from the below-mentioned VLP 39.

The IDP 38 reads LV data stored in the PVs by controlling one or more of the physical drives 21a to 21d, and writes the read LV data to the TVC 31 when a request to read the LVs from the loaded PVs is received from the VLP 39. In other words, the IDP 38 caches the LV in the TVC 31. The IDP 38 writes LV data to the PVs by controlling one or more of the physical drives 21a to 21d, when a request to write the LVs to the loaded PVs is received from the VLP 39.

The VLP 39 includes a CPU and a main storage device. The VLP 39 performs the following processing when commands to read LV data and to write LV data to the tape library 20 are received from the ICP 37. That is, the VLP 39 sends requests to the IDP 38 to perform PV loading and PV unloading, to read LVs from loaded PVs, and to write LVs to loaded PVs.

The VLP 39 stores logical volume information in association with an LV identifier, an identifier for a PV that stores LV data, and information that indicates whether the LV data of the logical volume is cached in the TVC 31. The VLP 39 also performs the following processing when an export command is received from the host 10 that indicates that LV data stored in the first physical volume is to be copied to the second physical volume. Specifically, the VLP 39 determines whether LVs cached in the TVC 31 exist among the LVs to be exported on the basis of the logical volume information. When the VLP 39 determines that LVs cached in the TVC 31 exist among the LVs to be exported, the VLP 39 performs the following processing. The VLP 39 stores, in the second physical volume, the LV data cached in the TVC 31 among the LVs to be exported regardless of the order specified in the export command. In this way, the VLP 39 is able to shorten the time for the export processing.

(VLP Functional Configuration)

Figure 2:
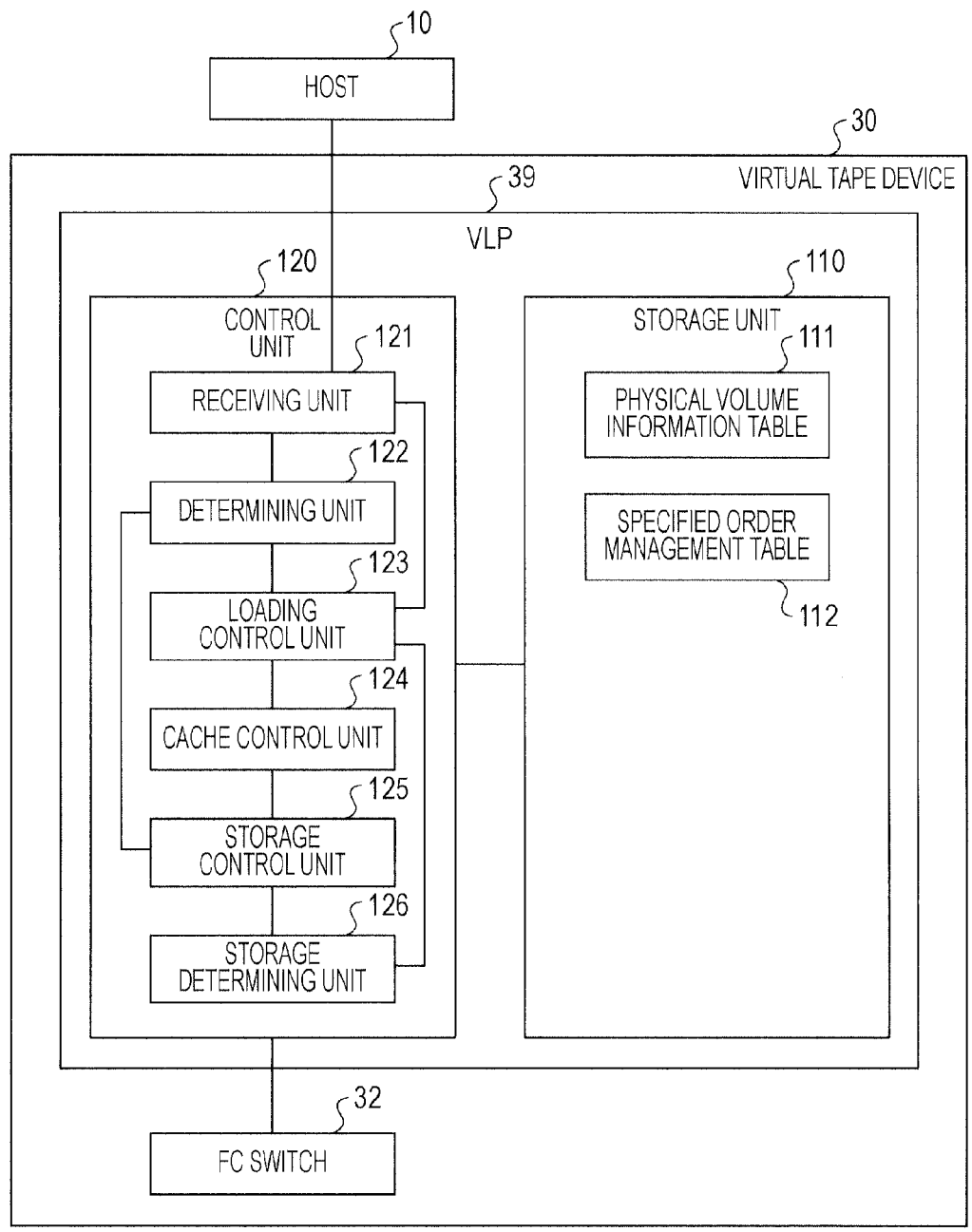
FIG. 2 is a functional block diagram of an example of a VLP functional configuration according to the first embodiment.

A description of the functional configuration of the VLP according to the first embodiment will be provided with reference to FIG. 2. FIG. 2 is a functional block diagram of an example of a VLP functional configuration according to the first embodiment. The VLP 39 according to the first embodiment includes a storage unit 110 and a control unit 120.

The storage unit 110 is, for example, a storage device such as a semiconductor memory element, and includes a logical volume information table 111 and a specified order management table 112. The logical volume information table 111 stores information in association with each other that includes a logical volume identifier, an identifier of a physical volume that stores data that is a logical volume, and information that indicates whether the logical volume is cached in the TVC 31.

A description of the information stored in the logical volume information table 111 is provided with reference to FIG. 3. FIG. 3 is an example of information stored in a logical volume information table according to the first embodiment. For example, the logical volume information table 111 includes "LV", "PV", "TVC", "Data size", and "Last update time" columns that store information in association with each other as illustrated in FIG. 3.

The information stored in the "LV" column in the logical volume information table 111 indicates LV identifiers. For example, "LV0001" and "LV0002" are stored in the "LV" column. The information stored in the "PV" column in the logical volume information table 111 indicates identifiers of PVs that store LV data. For example, "PV0001" and "PV0002" are stored in the "PV" column.

The "TVC" column in the logical volume information table 111 includes information that indicates whether an LV is cached in the TVC 31. For example, "cached" in the "TVC" column indicates that the associated LV is cached in the TVC 31, while "un-cached" indicates that the associated LV is not cached in the TVC 31.

The "Data size" column in the logical volume information table 111 includes information that indicates the LV data size. For example, "64 MB" and "128 MB" are stored in the "Data size" column. The "Last update time" column in the logical volume information table 111 includes information that indicates the time that the associated LV was last updated. For example, "2011/07/22 18:38:19" and "2011/07/22 20:42:54" are stored as the date and the time that the associated LVs were last updated in the "Last update time" column.

As an example in FIG. 3, the LV identified as LV0001 is stored in the PV identified as PV0001, and is described as not being cached in the TVC 31. The data size of the LV identified as LV0001 is 64 MB, and the date of the last update is indicated as Jul. 22, 2011 at 6 pm 38 minutes and 19 seconds as illustrated in FIG. 3.

The specified order management table 112 stores associated information of the order of the LVs specified when an export command is received, and information that indicates whether exporting of the particular LV has been completed. An explanation of the information stored in the specified order management table 112 is provided with reference to FIG. 4. FIG. 4 is an example of information stored in a specified order management table according to the first embodiment. For example, the specified order management table 112 includes "specified order", "LV", and "Processing completion" columns that include information stored in association with each other as illustrated in FIG. 4.

The "specified order" column in the specified order management table 112 includes information that indicates an order that is specified when the export command is received. For example, "1" and "2" are stored in the "specified order" column. The "LV" column in the specified order management table 112 includes information that indicates LV identifiers. For example, "LV0001" and "LV0002" are stored in the "LV" column.

The "Processing completion" column in the specified order management table 112 includes information that indicates whether exporting of the associated LV is completed. For example, "1" indicates that exporting of the associated LV is completed in the "Processing completion" column, while "0" indicates that the exporting of the associated LV is not completed.

As an example, the information of the LV identified as LV0001 and having a specified order of "1" indicates that the exporting is not completed in FIG. 4.

The control unit 120 is, for example, an electronic circuit such as a CPU or a micro processing unit (MPU), and includes a receiving unit 121, a determining unit 122, a loading control unit 123, a cache control unit 124, a storage control unit 125, and a storage determining unit 126.

The receiving unit 121 receives an export command from the host 10 that indicates that LV data stored in the first physical volume is to be copied to the second physical volume. The receiving unit 121 notifies the loading control unit 123 to load the second physical volume. The receiving unit 121 notifies the determining unit 122 that an export command has been received from the host 10.

When the receiving unit 121 receives the export command, the identifiers of the LVs to be exported are specified, for example, in the order "LV0001, LV0002, LV0003." This order indicates the order of the LVs to be exported that is received when the export command is received, but does not indicate the order for storing the LVs to be exported. The receiving unit 121 then stores the received order and the identifiers in association with each other in the specified order management table 112.

The following processing is performed when the determining unit 122 is notified by the receiving unit 121 that an export command has been received. The determining unit 122 determines whether LVs cached in the TVC 31 exist among the LVs to be exported on the basis of the information stored in the logical volume information table 111.

For example, the determining unit 122 reads the identifiers of the LVs to be exported from the specified order management table 112. The determining unit 122 then refers to the logical volume information table 111 to determine whether an LV is indicated as "cached" in the "TVC" column among the LVs to be exported. If it is determined that an LV indicated as "cached" in the "TVC" column exists among the LVs to be exported exists, the determining unit 122 reports the identifier of the particular LV to the storage control unit 125.

If it is determined that no LV indicated as "cached" exists in the "TVC" column among the LVs to be exported, the determining unit 122 reports to the mounting control unit 123 the fact that no cached LV exists in the TVC 31 among the LVs to be exported.

The mounting control unit 123 controls processing to load the first physical volume and the second physical volume in a physical drive of the tape library 20. The mounting control unit 123 controls a process for un-mounting the first physical volume and the second physical volume from a physical drive of the tape library 20. The PV mounting or un-mounting processing by the mounting control unit 123 is achieved by sending a request to the IDP 38 to execute the PV mounting and un-mounting processing.

For example, when the mounting control unit 123 is notified by the receiving unit 121 to load the second physical volume, the mounting control unit 123 loads the second physical volume in a physical drive. When the mounting control unit 123 is notified by the below-mentioned storage determining unit 126 that no LVs not stored in the second physical volume exist among the LVs to be exported, the mounting control unit 123 un-mounts the second physical volume.

When the mounting control unit 123 is notified by the determining unit 122 that no LV cached in the TVC 31 among the LVs to be exported exists, the mounting control unit 123 performs the following processing. Specifically, the mounting control unit 123 mounts the first physical volume that stores some of the LVs to be exported on a physical drive of the tape library 20 on the basis of the logical volume information table 111.

Especially, the mounting control unit 123 reads the identifiers of the LVs to be exported from the specified order management table 112. The mounting control unit 123 then refers to the logical volume information table 111 to select a PV identifier corresponding to any of the LV identifiers among the LVs to be exported, and mounts the selected PV.

For example, the mounting control unit 123 performs the following processing if it is determined by the below-mentioned storage determining unit 126 that LVs not stored in the second physical volume exist among the LVs to be exported. Specifically, the mounting control unit 123 mounts the first physical volume that stores any LV data not stored in the second physical volume on a physical drive of the tape library 20 on the basis of the logical volume information table 111.

Especially, the mounting control unit 123 reads the identifiers of the LVs not stored in the second physical volume among the LVs to be exported from the specified order management table 112. The mounting control unit 123 then refers to the logical volume information table 111 to select a PV identifier corresponding to any of the LV identifiers among the LVs to be exported, and loads the selected PV. The mounting control unit 123 notifies the below-mentioned cache control unit 124 that a first physical volume has been mounted on a physical drive.

If, for example, the mounting control unit 123 is notified by the below-mentioned cache control unit 124 that an LV to be exported is cached in the TVC 31, the mounting control unit 123 un-mounts the first physical volume from the physical drive.

The cache control unit 124 caches, in the TVC 31, the LVs included in the first physical volume mounted on a physical drive of the tape library 20 by the mounting control unit 123 among the LVs to be exported.

For example, the cache control unit 124 reads the LVs to be exported from the first physical volume loaded on a physical drive and caches the LVs to be exported in the TVC 31. As an example, the cache control unit 124 refers to the specified order management table 112 to read the identifier of the LVs included in the same PV as the PV mounted in the physical drive, and then caches the LVs in the TVC 31.

When an LV included in the first physical volume is cached in the TVC 31, the cache control unit 124 writes "cached" in the "TVC" column for the cached LV in the logical volume information table 111.

The cache control unit 124 notifies the mounting control unit 123 that an LV to be exported is cached in the TVC 31. The cache control unit 124 notifies the storage control unit 125 about the LVs cached in the TVC 31 among the LVs to be exported.

When the storage control unit 125 determines that LVs cached in the TVC 31 exist among the LVs to be exported, the storage control unit 125 performs the following processing. The storage control unit 125 stores, in the second physical volume, the LVs cached in the TVC 31 among the LVs to be exported regardless of the order specified in the export command.

For example, the storage control unit 125 stores, in the second physical volume, the LVs with the identifiers notified by the determining unit 122. The storage control unit 125 writes "1" in the specified order management table 112 to indicate the LVs that have been exported in the "Processing completion" column corresponding to the identifiers of the LVs stored in the second physical volume.

The storage control unit 125 further stores, in the second physical volume, the data of the LVs cached by the cache control unit 124. For example, the storage control unit 125 stores, in the second physical volume, the LVs with the identifiers notified by the cache control unit 124. The storage control unit 125 writes "1" in the specified order management table 112 to indicate the LVs that have been exported in the "Processing completion" column corresponding to the identifiers of the LVs stored in the second physical volume.

The storage determining unit 126 determines whether any LVs not stored in the second physical volume exist among the LVs to be exported when the data of the LVs to be exported is stored in the second physical volume by the storage control unit 125.

For example, the storage determining unit 126 refers to the specified order management table 112 to determine whether any LVs exist for which "1", which indicates that the LV has been exported, is not written in the "Processing completion" column. In other words, the storage determining unit 126 determines whether any of the stored LVs are indicated as "0" in the "Processing completion" column which indicates that the exporting has not been completed.

The storage determining unit 126 performs the following processing if it is determined that LVs not stored in the second physical volume exist among the LVs to be exported. Specifically, the storage determining unit 126 notifies the loading control unit 123 to load the first physical volume that stores any of the LVs not stored in the second physical volume.

When the storage determining unit 126 determines that no LVs not stored in the second physical volume exist among the LVs to be exported exist, the storage determining unit 126 notifies the mounting control unit 123 to un-mount the second physical volume.

(Processing by the Virtual Tape Device According to the First Embodiment)

Figure 5:
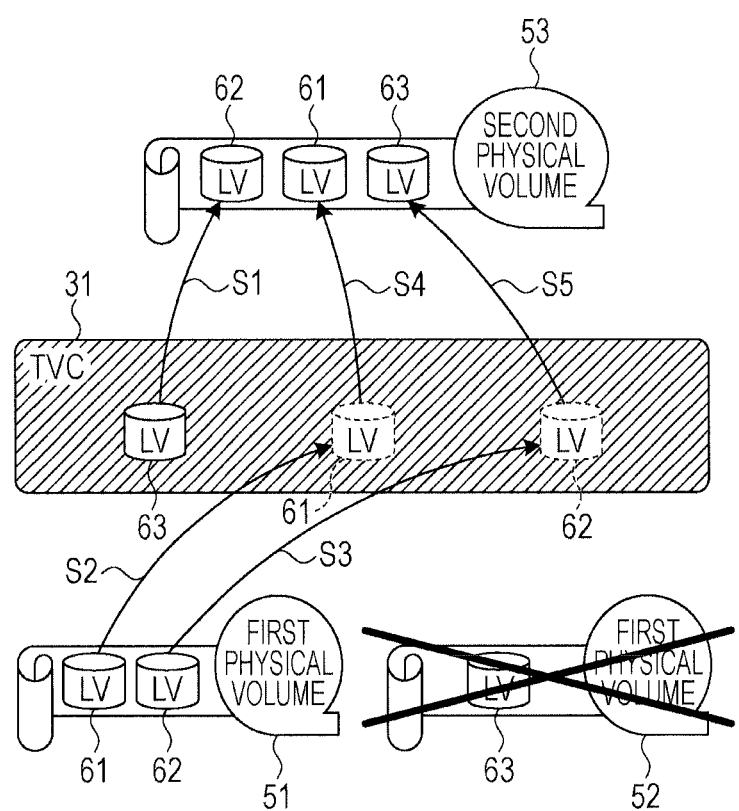
FIG. 5 illustrates an example of processing by the virtual tape device according to the first embodiment.
Figure 6:
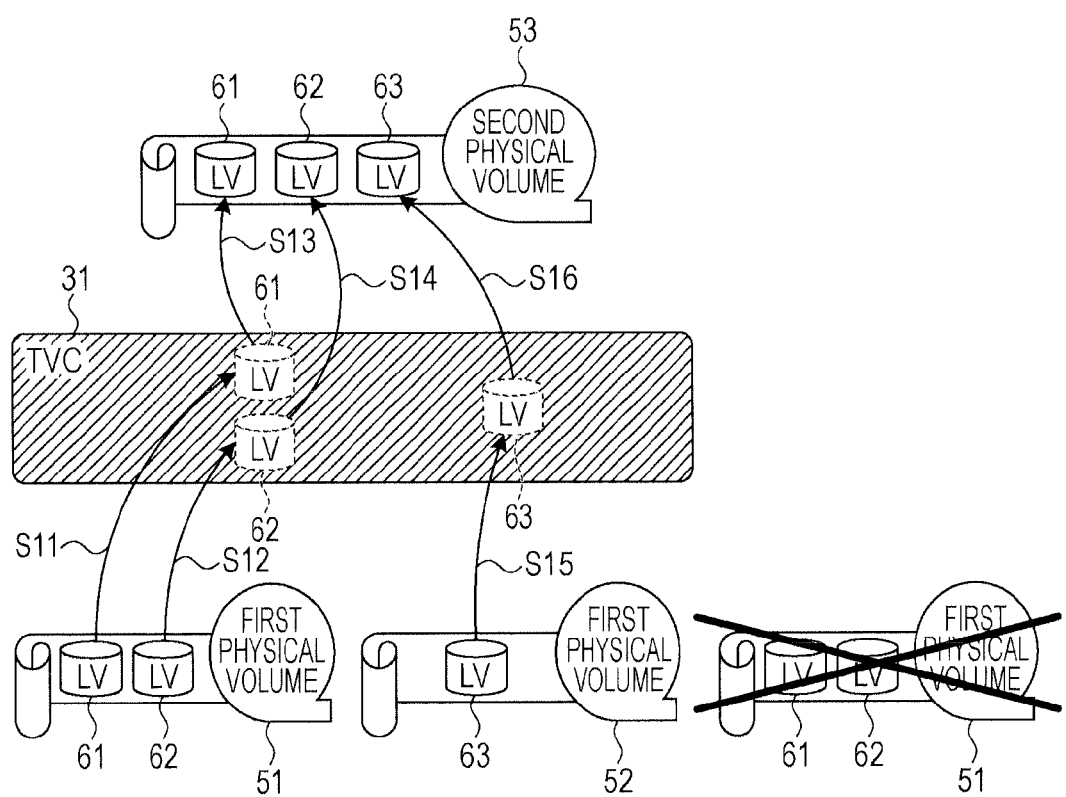
FIG. 6 illustrates another example of processing by the virtual tape device according to the first embodiment.

Processing by the virtual tape device according to the first embodiment will be described below with reference to FIGS. 5 and 6. FIG. 5 illustrates an example of processing by the virtual tape device according to the first embodiment, and FIG. 6 illustrates another example of processing by the virtual tape device according to the first embodiment.

It is assumed in the example in FIG. 5 that the specified order of the LVs to be exported is LV 61, LV 62, LV 63, and the LV 61 and the LV 62 are stored in a first physical volume 51, and the LV 63 is stored in a first physical volume 52. Moreover, the LV 63 is already cached in the TVC 31 and the TVC 31 is full.

In the example illustrated in FIG. 5, the determining unit 122 determines that the LV 63 among the LVs to be exported is cached in the TVC 31. As a result, the storage control unit 125 writes the LV 63 to a second physical volume 53 (step S1).

The storage determining unit 126 determines that LVs 61 and 62 among the LVs to be exported are not stored in the second physical volume 53. The mounting control unit 123 mounts the first physical volume 51. The cache control unit 124 then reads the LVs 61 and 62 onto the TVC 31 (steps S2 and S3). The storage control unit 125 writes the LVs 61 and 62 to the second physical volume 53 (steps S4 and S5).

The storage determining unit 126 then determines that no LVs not stored in the second physical volume 53 among the LVs to be exported exist, and the export processing is completed.

In this way, the virtual tape device 30 writes the LV 63 to be exported and that is already cached from the TVC 31 to the second physical volume before the LVs 61 and 62 regardless of the specified order of the LVs to be exported. As a result, the virtual tape device 30 is able to inhibit the execution of the excessive processing of un-mounting and then remounting the first physical volume 52 that stores the LV 63.

It is assumed in the example in FIG. 6 that the specified order of the LVs to be exported is LV 61, LV 63, and LV 62, and the LV 61 and the LV 62 are stored in the first physical volume 51, and the LV 63 is stored in the first physical volume 52. Moreover, the LV 61, the LV 63, and the LV 62 are all uncached.

In the example illustrated in FIG. 6, the determining unit 122 determines that no LV among the LVs to be exported is cached in the TVC 31. As a result, the mounting control unit 123 loads the first physical volume 51 that stores the LV 61 and the LV 62.

The cache control unit 124 then reads the LV 61 and the LV 62 to the TVC 31 regardless of the specified order of the LVs to be exported (steps S11 and S12 respectively). The storage control unit 125 writes the LVs 61 and 62 read onto the TVC 31 to the second physical volume 53 (steps S13 and S14 respectively).

The mounting control unit 123 un-mounts the first physical volume 51 and mounts the first physical volume 52. The cache control unit 124 reads the LV 63 from the first physical volume 52 onto the TVC 31 (step S15). The storage control unit 125 writes the LV 63 read onto the TVC 31 to the second physical volume 53 (step S16).

The storage determining unit 126 then determines that no LVs not stored in the second physical volume 53 exist among the LVs to be exported, and the export processing is completed.

In this way, the virtual tape device 30 also reads the LV 62 from the first physical volume 51 when reading the LV 61 from the first physical volume 51 regardless of the order specified of the LVs to be exported. As a result, the virtual tape device 30 is able to inhibit the execution of excessive mounting and un-mounting and then remounting the first physical volume 51.

(Flow of Processing by the Virtual Tape Device According to the First Embodiment)

Processing by the virtual tape device according to the first embodiment will be described below with reference to FIG. 7.

Figure 7:
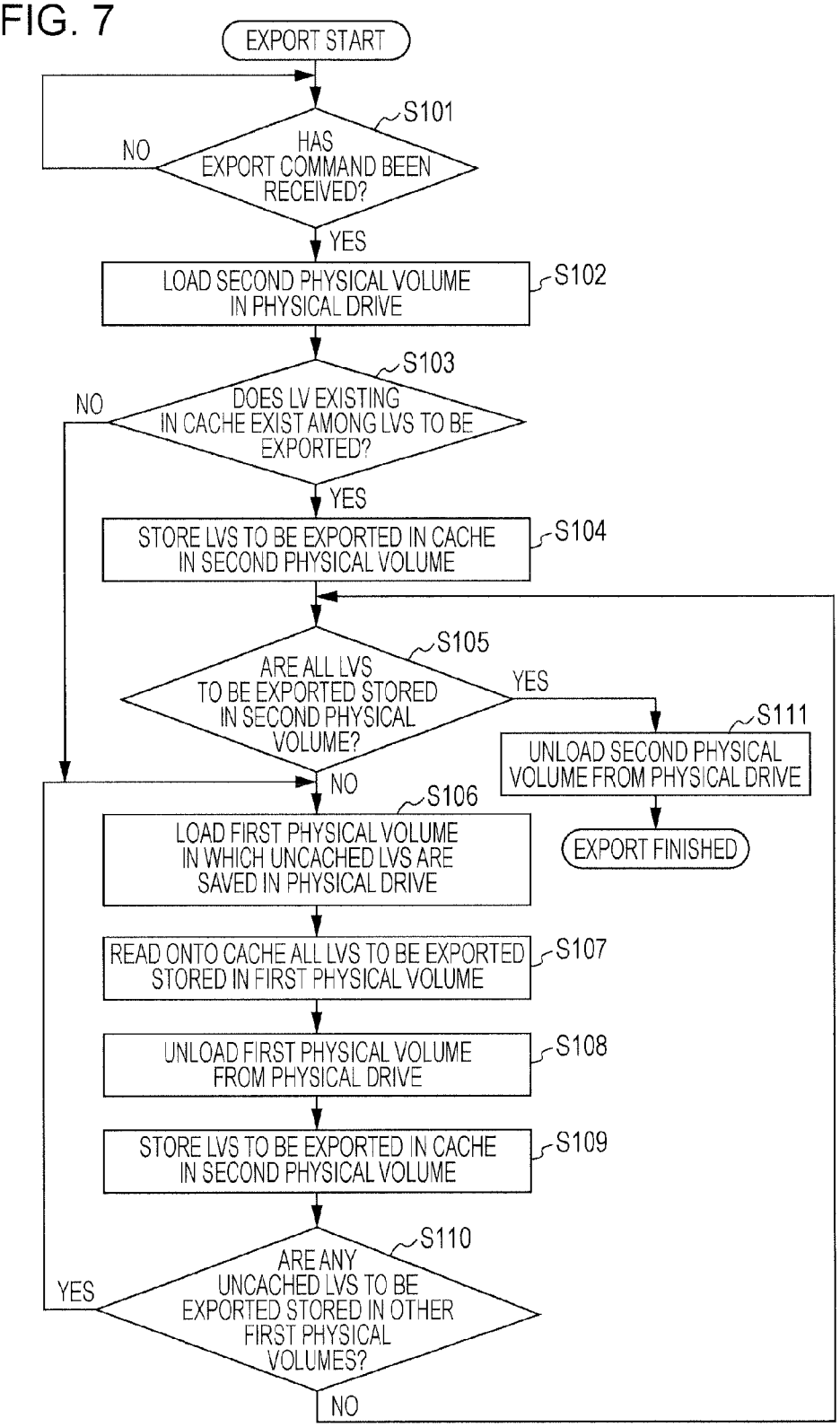
FIG. 7 is a method of processing by the virtual tape device according to the first embodiment.
Figure 8:
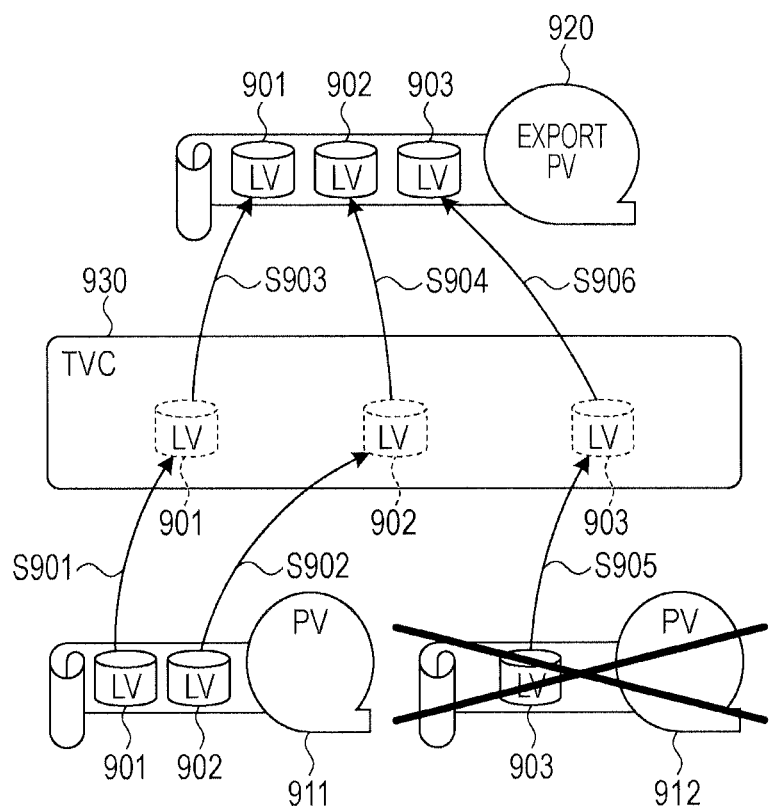
FIG. 8 illustrates an example of an export process for un-cached LVs.
Figure 9:
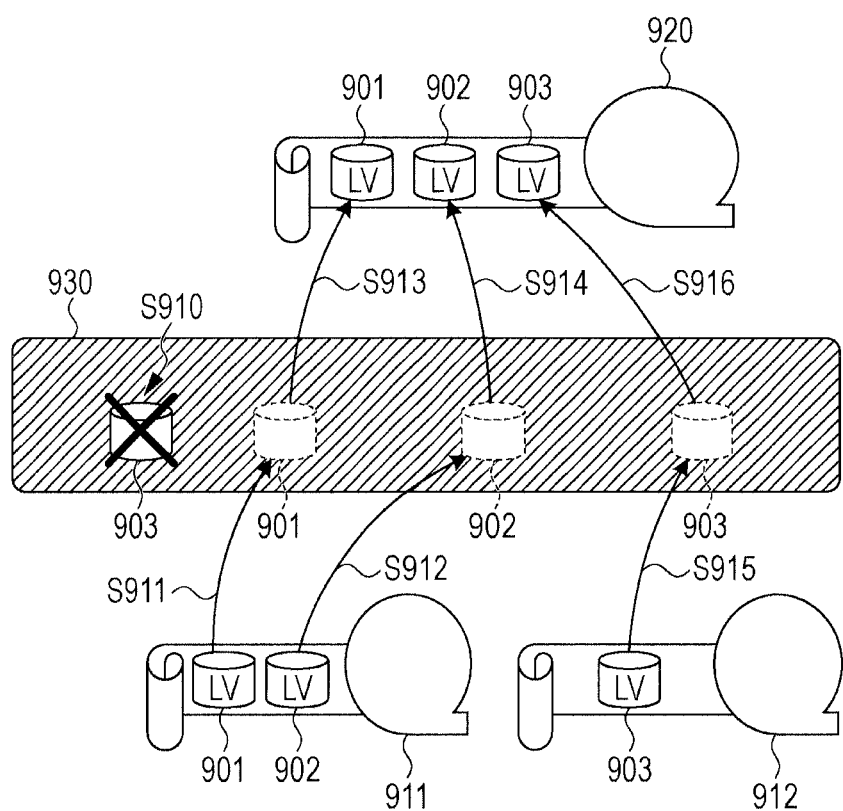
FIG. 9 illustrates an example of excessive PV mounting and un-mounting performed in an export process.
Figure 10:
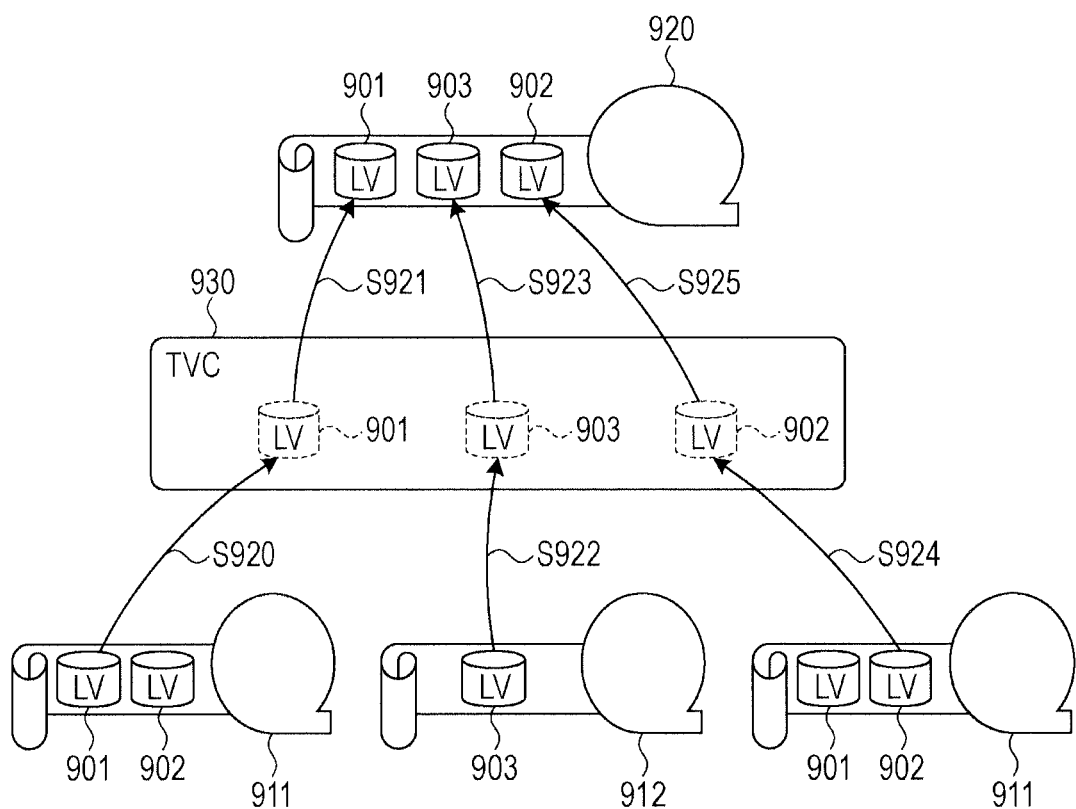
FIG. 10 illustrates another example of excessive PV mounting and un-mounting performed in an export process.

FIG. 7 is a method of processing by the virtual tape device according to the first embodiment.

As illustrated in FIG. 7, the receiving unit 121 determines whether an export command has been received from the host 10 (step S101). If the receiving unit 121 determines that no export command has been received at this time (step S101: No), the receiving unit 121 continues to make the determination as to whether an export command has been received from the host 10.

If the receiving unit 121 determines that an export command has been received from the host 10 (step S101: Yes), the mounting control unit 123 mounts the second physical volume in a physical drive (step S102). The determining unit 122 then determines whether an LV existing in the cache exists among the LVs to be exported (step S103).

When the determining unit 122 determines that an LV existing in the cache exists among the LVs to be exported (step S103: Yes), the storage control unit 125 performs the following processing. Especially, by the storage control unit 125, the LVs to be exported existing on the cache are stored in the second physical volume (step S104).

On the other hand, if the determining unit 122 determines that no LV existing in the cache exists among the LVs to be exported (step S103: No), the routine of the virtual tape device 30 moves to step S106.

The storage determining unit 126 then determines whether all of the LVs to be exported are stored in the second physical volume (step S105). The mounting control unit 123 performs the following processing if it is determined by the storage determining unit 126 that not all of the LVs to be exported are stored in the second physical volume (step S105: No). Especially, the mounting control unit 123 mounts, in a physical drive, the first physical volume in which the un-cached LVs to be exported are saved (step S106).

The cache control unit 124 reads, onto the cache, all of the LVs to be exported that are stored in the first physical volume mounted in the physical drive (step S107). After all of the LVs to be exported and stored in the first physical volume were read onto the cache by the cache control unit 124, the mounting control unit 123 then un-mounts the first physical volume from the physical drive (step S108). The storage control unit 125 next causes the LVs to be exported existing on the cache to be stored in the second physical volume (step S109).

The storage determining unit 126 then determines whether any un-cached LVs to be exported are stored other first physical volumes (step S110). If the storage determining unit 126 determines that an un-cached LV to be exported is stored in another first physical volume (step S110: Yes), the routine of the virtual tape device 30 moves to step S106. Conversely, if the storage determining unit 126 determines that no un-cached LV to be exported is stored in another first physical volume (step S110: No), the routine of the virtual tape device 30 moves to step S105.

If it is determined by the storage determining unit 126 in step S105 that all of the LVs among the LVs to be exported are stored in the second physical volume (step S105: Yes), the loading control unit 123 performs the following processing. Specifically, the mounting control unit 123 un-mounts the second physical volume from the physical drive (step S111). After the processing in step S111 is completed, the virtual tape device 30 finishes the export processing.

(Effect of the First Embodiment)

As described above, the virtual tape device 30 according to the first embodiment is able to reduce the time for the export processing.

For example, the virtual tape device 30 according to the first embodiment stores the LVs to be exported that are in an cached state in the second physical volume first. That is, the virtual tape device 30 according to the first embodiment is able to inhibit the LVs to be exported from being removed by the cache when the cache is full. As a result, the virtual tape device 30 according to the first embodiment is able to avoid processing to reload the first physical volume in which the cached LVs to be exported are stored to then read the LVs to be exported. As a result, the virtual tape device 30 according to the first embodiment is able to reduce the time taken for the export processing.

The virtual tape device 30 according to the first embodiment reads all of the LVs to be exported stored in the first physical volume when reading the LVs to be exported that are in the cached state from the first physical volume. As a result, the virtual tape device 30 according to the first embodiment is able to avoid subsequent reloading of the first physical volume and subsequent reading. As a result, the virtual tape device 30 according to the first embodiment is able to reduce the time for the export processing.

Embodiment 2

The embodiments discussed herein may be implemented in various different modes other than the embodiment described above. A second embodiment describes another embodiment.

(System Configuration)

Among the processing described in the present embodiment, all or some of the processing described as being conducted automatically may be conducted manually. Conversely, all or some of the processing described as being conducted manually may be conducted automatically using known methods. The procedures, the control procedures, and the specific names that have been described in the specification and illustrated in the drawings may be altered, unless specified in particular.

The information stored in the logical volume information table 111 illustrated in FIG. 3 is merely an example and thus the information is not necessarily stored as illustrated in FIG. 3 and may be changed as appropriate. For example, the logical volume information table 111 may also store information that indicates whether a PV is mounted in a physical drive.

The constituent elements of the illustrated parts are functional and conceptual perspectives and do not have to be configured physically as illustrated. For example, the mounting control unit 123 and the storage determining unit 126 may be integrated in the VLP 39. All or a part of the processing functionality implemented by the components may be performed by a CPU and a program that is analyzed and executed by the CPU, or may be implemented as hardware with wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual tape comprising:
   a memory to record logical volume information including an identifier of a logical volume, an identifier of a physical volume storing the logical volume, and information indicating whether the logical volume is cached in a cache unit;

a determining unit configured to receive a copy command to copy a plurality of logical volumes stored in one or more first physical volumes to a second physical volume, the copy command including a numerical order for copying the plurality of logical volumes and to determine, based on the logical volume information, whether logical volumes cached in the cache unit are among the plurality of logical volumes in the copy command; and a storage unit configured to store the logical volumes cached in the cache unit to the second physical volume, without reference to the numerical order for copying the plurality of logical volumes included in the copy command, when the cache is full and the determining unit determines the logical volumes cached in the cache unit are among the plurality of logical volumes in the copy command.

2. The virtual tape device according to claim 1, further comprising:

a mounting control unit that, when the determining unit determines that the logical volume cached in the cache unit does not exist among the logical volumes at receiving the copy command, mounts the first physical volume that stores any of the logical volumes indicated by the copy command to a drive of a tape library, based on the logical volume information; and a cache control unit that caches the logical volume included in the first physical volume mounted in the drive of the tape library by the mounting control unit in the cache unit among the logical volumes at receiving the copy command; wherein the storage control unit further stores the data of the logical volume cached by the cache control unit in the second physical volume.

3. The virtual tape device according to claim 1, further comprising:

a storage determining unit that, when the data of the logical volume indicated in the copy command is stored in the second physical volume by the storage control unit, determines whether another logical volume not stored in the second physical volume among the logical volumes at receiving the copy command exists or not; wherein when the logical volume not stored in the second physical volume among the logical volumes indicated in the copy command is determined by the storage determining unit to exist, the mounting control unit further mounts the first physical volume that stores data of any logical volume not stored in the second physical volume in the drive of the tape library based on the logical volume information.

4. A control method of a virtual tape device, the method comprising:

recording, in a memory, logical volume information including an identifier of a logical volume, an identifier of a physical volume storing the logical volume, and information indicating whether the logical volume is cached in a cache unit receiving a copy command to copy a plurality of logical volumes stored in one or more first physical volumes to a second physical volume, the copy command including a numerical order for copying the plurality of logical volumes;

determining, based on the logical volume information, whether logical volumes cached in the cache unit are among the plurality of logical volumes in the copy command; and storing the logical volumes cached in the cache unit to the second physical volume, without reference to the numerical order for copying the plurality of logical volumes included in the copy command, when the cache is full and it is determined that the logical volumes cached in the cache unit are among the plurality of logical volumes in the copy command.

* * * * *